United States Patent [19]

Van Broekhoven et al.

[11] Patent Number: 5,169,927
[45] Date of Patent: Dec. 8, 1992

[54] PROCESS FOR THE PREPARATION OF POLYKETONE POLYMERS IN THE PRESENCE OF WATER

[75] Inventors: Johannes A. M. Van Broekhoven; Rudolf J. Wijngaarden, both of Amsterdam, Netherlands

[73] Assignee: Shell Oil Company, Houston, Tex.

[21] Appl. No.: 730,145

[22] Filed: Jul. 15, 1991

[30] Foreign Application Priority Data

Nov. 8, 1990 [NL] Netherlands ............... 9002431

[51] Int. Cl.$^5$ ............................. C08G 67/02
[52] U.S. Cl. ............................. 528/392
[58] Field of Search ............................. 528/392

[56] References Cited

U.S. PATENT DOCUMENTS 4,740,625  4/1988  Drent .................... 528/392
4,889,914  12/1989  Van Broekhoven et al. ...... 528/392

FOREIGN PATENT DOCUMENTS 307027  3/1989  European Pat. Off. .

Primary Examiner—Harold D. Anderson

[57] ABSTRACT

A process for the preparation of polymers comprising a linear alternating polymer of carbon monoxide and at least one olefinically unsaturated hydrocarbon, in the presence of a diluent consisting of one or more lower aliphatic alcohols where water has been added to the solution of a catalyst.

10 Claims, No Drawings

PROCESS FOR THE PREPARATION OF POLYKETONE POLYMERS IN THE PRESENCE OF WATER

BACKGROUND OF THE INVENTION

The invention relates to a process for the preparation of polymers of carbon monoxide with one or more olefinically unsaturated compounds.

Linear polymers of carbon monoxide with one or more olefinically unsaturated compounds, in which the polymer units originating from carbon monoxide on the one hand and the polymer units originating from the olefinically unsaturated compounds on the other hand, occur in a substantially alternating arrangement, and can be prepared by contacting the monomers at an elevated temperature and pressure and in the presence of a diluent in which the polymers are insoluble or virtually insoluble with a solution of a catalyst composition that suits the purpose.

As a rule, the polymerization is carried out by introducing a catalyst solution into a reactor which contains the monomers and the diluent and which is at the desired temperature and pressure. During the polymerization the polymers are obtained in the form of a suspension in the diluent. When the required degree of polymerization has been achieved, the polymerization is terminated, as a rule by cooling the reaction mixture to room temperature and releasing the pressure. The polymer is then removed from the suspension, washed and dried.

In regards to the diluent to be used in the polymerization, lower aliphatic alcohols such as methanol are preferred, since it has been found that the catalyst compositions suiting the purpose of the present invention have the highest polymerization rate when dissolved in methanol. A drawback of the use of lower aliphatic alcohols as a diluent for the aforesaid polymerization is that the prepared polymers contain 4000-15,000 ppmw of the applied alcohol, and that this quantity of alcohol cannot be removed from the polymer even by prolonged and careful drying. It must be assumed that this quantity of alcohol is chemically bonded to the polymers, since it has been found that the alcohol content is hardly changed after extrusion of the polymers at temperatures of around 270° C.

The high alcohol content can be a problem if the present polymers are used as packaging material for foodstuffs. It is therefore worth devoting attention to the reduction of this high alcohol content.

Extensive research has been carried out on this subject. Initially, the desired goal was to treat the polymers at high temperature with water or steam. Although the alcohol content of the polymers could be reduced in this way, the resulting deterioration in the properties of the polymers was such that these methods had to be rejected.

In the course of continued research into this subject, it has now surprisingly been found that in the preparation of the aforesaid alternating polymers using one or more lower aliphatic alcohols as diluent, polymers with a reduced alcohol content can be prepared by adding water to the diluent.

SUMMARY OF THE INVENTION

The present patent application therefore relates to a process for the preparation of linear polymers of carbon monoxide with one or more olefinically unsaturated compounds in which the polymer units originating from carbon monoxide on the one hand and the units originating from the olefinically unsaturated compounds on the other hand occur in a substantially alternating order. These units are prepared by contacting the monomers at elevated temperature and pressure, in the presence of a diluent consisting of one or more lower aliphatic alcohols to which water has been added with a solution of a catalyst composition suitable for this purpose. The patent application further relates to the polymers thus prepared as well as to shaped objects consisting at least partly of those polymers.

The polymerization according to the invention is preferably carried out in the presence of a diluent that contains methanol as the lower aliphatic alcohol. The quantity of water in the diluent preferably amounts to at least 2.5% w. The diluent further comprises a maximum of 15 % w water and preferably a maximum of 10 % w water.

DETAILED DESCRIPTION OF THE INVENTION

In the process of the invention, a catalyst is used which, starting from a mixture of carbon monoxide and one or more olefinically unsaturated compounds, is cable of catalyzing the formation of the previously mentioned linear alternating polymers. Suitable catalysts for the present purpose are catalysts which comprise a Group VIII metal. In this patent application, Group VIII metals are understood to be the noble metals ruthenium, rhodium, palladium, osmium, iridium and platinum, as well as the iron group metals iron, cobalt and nickel. Preference is given to catalysts which include palladium, nickel or cobalt as Group VIII metal. Particular preference is given to palladium as Group VIII metal. If the catalysts that are used in the process of the invention comprise a Group VIII metal, it is preferably incorporated in the catalyst in the form of a salt of a carboxylic acid, in particular in the form of an acetate.

In addition to a Group VIII metal, the catalysts preferably include a bidentate ligand which can form a complex with the Group VIII metal by two phosphorus-, nitrogen- or sulphur-containing dentate groups present in the bidentate ligand. If a nitrogen bidentate ligand is used, preference is given to compounds of the general formula

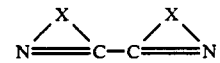

wherein X represents an organic bridge group containing three or four atoms in the bridge, at least two of which are carbon atoms, such as 2,2'-bipyridine and 1,10-phenanthroline. If a sulphur bidentate ligand is used, preference is given to compounds of the general formula $R_1S$-R-$SR_1$, wherein $R_1$ represents an optionally polar-substituted hydrocarbon group and R represents a bivalent organic bridge group containing at least two carbon atoms in the bridge, such as 1,2-bis(ethylthio)ethane and cis-1,2-bis(benzylthio)ethene. Preference is given to the use of phosphorus bidentate ligands of the general formula $(R_1)_2P$-R-$P(R_1)_2$, wherein R and $R_1$ have the previously given meanings. Preference is further given to the use of phosphorus bidentate ligands of this type in which $R_1$ represents an aromatic hydrocarbon group having at least one alkoxy substituent in the ortho position relative to the phosphorus atom to which it is attached. A very suitable compound for the present purpose is 1,3-bis[bis(2-methoxyphenyl)phosphino]propane. If a nitrogen or sulphus bidentate ligand is used in the catalysts, the quantity used is preferably 0.5-100 and in particular 1-50 mole per g.atom Group VIII metal. If a phosphorus bidentate ligand is used, the quantity used is preferably 0.5-2 and in particular 0.75-1.5 mole per g.atom Group VIII metal.

In addition to a Group VIII metal and a phosphorus, nitrogen or sulphur bidentate ligand, the catalysts preferably include an anion of an acid with a pKa of less than 4 and in particular an anion of an acid with a pKa of less than 2. Examples of suitable acids with a pKa of less than 2 are sulphonic acids such as para-toluenesulphonic acid and halogencarboxylic acids such as trifluoroacetic acid. The introduction of an anion of an acid with a pKa of less than 4 into the catalysts can take place in the form of an acid and/or in the form of a slat of a non-noble transition metal such as a chromium or iron salt. The anion is preferably present in the catalysts in a quantity of 1-100 and in particular 2-50 moles per g.atom Group VIII metal.

In addition to catalysts based on the three aforementioned components, a) a Group VIII metal compound, b) an acid with a pKa of less than 4 or a non-noble transition metal salt thereof, and c) a bidentate ligand containing two phosphorus-, nitrogen- or sulphur-containing dentate groups, the catalysts eligible for the present purpose can also be corresponding catalysts on the basis of two components by combining components a) and b) such as by the application of palladium trifluorocacetate or palladium para-tosylate, or by combining components b) and c) such as by the application of ortho-(diphenylphosphino)benzenesulphonic acid or 3-(diphenylphosphino)propanesulphonic acid. In order to enhance the acitvity of the Group VIII metal-containing catalysts, a 1,4-quinone may be additionally incorporated therein. For that purpose, 1,4-benzoquinone and 1,4-naphthoquinone are very suitable. The quantity of 1,4-quinone used preferably amounts ob 5-5,000 and in particular 10-1000 moles per g atom Group VIII metal.

Olefinically unsaturated compounds that can be polymerized with carbon monoxide by using the process of the invention may be compounds consisting exclusively of carbon and hydrogen, as well as compounds which contain, in addition to carbon and hydrogen, one or more heteroatoms. The process of the invention is preferably used in the preparation of polymers of carbon monoxide with one or more olefinically unsaturated hydrocarbons. Examples of suitable hydrocarbon monomers are ethene, propene, butene-1, hexene-1, octene-1, styrene, cyclopentene, norborene and dicyclopentadiene, The process of the invention is in particular very suitable for application in the preparation of copolymers of carbon monoxide with ethene and in the preparation of terpolymers of carbon monoxide with ethene and an α-olefin; in particular propene.

The quantity of catalysts composition employed in the process of the invention may vary within wide limits. If a Group VIII metal-containing catalysts is used, a quantity of catalysts is preferably used per mole of olefinically unsaturated compound to be polymerized which contains $10^{-7}$ to $10^{-3}$ and in particular $10^{-6}$ to $10^{-4}$ g atom Group VIII metal.

The process of the invention is preferably carried out at a temperature of 25°-150° C. and a pressure of 2-150 bar and preferably at a temperature of 30°-130° C. and a pressure of 5 -100 bar. The molar ratio of olefinically unsaturated compounds relative to carbon monoxide is 10:1 to 1:10 but preferably 5:1 to 1:5.

The ranges and limitations provided in the instant specification and claims are those which are believed to particularly point out and distinctly claim the instant invention. It is, however, understood that other ranges and limitations that perform substantially the same function in substantially the same way to obtain substantially the same result are intended to be within the scope of the instant invention as defined by the instant specification and claims.

EXAMPLES

The invention will be described by the following examples which are provided for illustrative purposes and are not to be construed as limiting the invention:

Example 1

A carbon monoxide/ethene/propene terpolymer was prepared as follows. 144 g methanol was introduced into a stirred autoclave with a capacity of 300 ml. The air in the autoclave was driven out by forcing in carbon monoxide to a pressure of 50 bar and then releasing the pressure and repeating this procedure two more times. After the contents of the autoclave had been brought to 78° C, 19 bar propene was forced in, then 11 bar ethene and finally 30 bar carbon monoxide. After this, a catalyst solution was introduced into the autoclave, consisting of:

2 ml acetone,
0.01 mmol palladium acetate,
0.01 mol 1,3-bis[bis(2-methoxyphenyl)phosphino]propane, and
0.2 mmol trifluoracetic acid.

During the polymerization the pressure in the autoclave was maintained by forcing in a 1:1 carbon monoxide/ethene mixture. After 2 hours the polymerization was terminated by cooling to room temperature and releasing the pressure. The terpolymer was filtered off, washed with methanol and dried at 70° C. 13 g terpolymer was obtained with a methanol content of 7000 ppmw. The polymerization rate was 6.1 kg terpolymer/(g palladium.hour).

Example 2

A carbon monoxide/ethene/propene terpolymer was prepared in substantially the same way as in Example 1, but with the difference that 0.8 g of the 144 g methanol was replaced by water.

14 g terpolymer was obtained with a methanol content of 3000 ppmw. The polymerization rate was 6.6 kg terpolymer/)g palladium.hour).

Example 3

A carbon monoxide/ethene/propene terpolymer was prepared in substantially the same way as in Example 1, but with the difference that 2.9 g of the 144 g methanol was replaced by water.

16 g terpolymer was obtained with a methanol content of 1100 ppmw. The polymerization rate was 7.5 kg terpolymer/(g palladium.hour).

Example 4

A carbon monoxide/ethene/propene terpolymer was prepared in substantially the same way as in Example 1, but with the difference that 7.2 g of the 144 g methanol was replaced by water.

15 g terpolymer was obtained with a methanol content of 100 ppmw. The polymerization rate was 7.1 kg terpolymer/(g palladium.hour).

Example 5

A carbon monoxide/ethene/propene terpolymer was prepared in substantially the same way as in Example 1, but with the difference that 14.4 g of the 144 g methanol was replaced by water.

Fourteen g terpolymer was obtained with a methanol content of <50 ppmw. The polymerization rate was 6.6 kg terpolymer/g palladium.hour).

The methanol content of the polymers was determined by extracting them for 20 hours at 120° C. with water and analyzing the aqueous phase with the aid of GLC. To establish that a complete extraction of methanol really had been accomplished in this way, the methanol content of the polymer prepared according to example 1 was also determined by dissolving the ploymer in hexafluor-isopropanol and analyzing the solution with NMR. This procedure also gave a methanol content of 7000 ppmw.

Of the examples 1-5, examples -5 were according to the invention. In these examples the polymerization was carried out in the presence of a diluent consisting of methanol to which water had been added. Example 1 falls outside the scope of the invention and is included in the patent application for comparison. In this example no water was added to the methanol. It was established by NMR analysis that the polymers prepared according to examples 1-5 were built up of linear chains in which on the one hand the units from carbon monoxide and on the other hand the units from ethene and propene occurred in an alternating arrangement. In the polymer chains the units from ethene and propene occurred in a randomly distributed manner.

What is claimed is:

1. A process for the preparation of a linear alternating polymer of carbon monoxide monomer and one or more olefinically unsaturated hydrocarbon monomers comprising contacting the monomer under polymerization conditions in the presence of a reaction diluent and a catalyst composition formed from a compound of palladium, an anion of an acid with a pKa of less than 4, and a bidentate phosphorus ligand, wherein the reaction diluent comprises one or more lower aliphatic alcohols and water, present in an amount from about 2.5% w to about 15% w, based on total diluent.

2. A process for the preparation of polymers according to claim 1, wherein said reaction diluent comprises methanol as a lower aliphatic alcohol.

3. A process for the preparation of polymers according to claim 1, wherein said diluent contains from a minimum of 2.5% w water to a maximum of 10% w water.

4. A process for the preparation of polymers according to claim 1, wherein the bidentate phosphorus ligand is of the formula $(R_1)_2P\text{-}R\text{-}P(R_1)_2$, wherein $R_1$ represents a hydrocarbon group with or without polar substitution and R represents a bivalent organic bridge group containing at least two carbon atoms in the bridge.

5. A process for the preparation of polymers according to claim 1, wherein the compound of palladium is palladium acetate.

6. A process for the preparation of polymers according to claim 1, wherein the bidentate phosphorus ligand is 1,3-bis[bis(2-methoxyphenyl)-phosphino]propane.

7. A process for the preparation of polymers according to claim 1, wherein the acid has a pKa of less than 2.

8. A process for the preparation of polymers according to claim 1, wherein the anion of an acid with a pKa of less than 4 is an anion of a para-toluenesulphonic acid or a trifluoracetic acid.

9. A process for the preparation of polymers according to claim 1, wherein the catalyst further comprises a 1,4-benzoquinone or 1,4-naphthoquinone.

10. A process for the preparation of polymers according to claim 1, wherein the oleginically unsaturated hydrocarbons are ethene or a mixture of ethene and propene.

* * * * *